United States Patent
Nagaoka (10) Patent No.: US 6,200,467 B1
(45) Date of Patent: Mar. 13, 2001

(54) FILTERING DEVICE WITH ROTATABLE BACKWASH TUBE

(76) Inventor: Tadayoshi Nagaoka, 573-2, Oazu Ureshi, Tondabayashi-shi, Osaka-fu (JP)

( * ) Notice: Subject to any disclaimer, the term of this patent is extended or adjusted under 35 U.S.C. 154(b) by 0 days.

(21) Appl. No.: 09/302,098

(22) Filed: Apr. 29, 1999

(30) Foreign Application Priority Data

May 6, 1998 (JP) ................................................. 10-139167

(51) Int. Cl.[7] .................................................. B01D 35/00
(52) U.S. Cl. ...................... 210/136; 210/194; 210/323.2; 210/333.01; 210/355; 210/411; 210/413; 210/415
(58) Field of Search ..................................... 210/409, 411, 210/412, 413, 414, 415, 355, 107, 108, 136, 323.2, 333.01, 333.1, 341, 416.1, 194

(56) References Cited

U.S. PATENT DOCUMENTS

| | | | |
|---|---|---|---|
| 4,308,142 | * | 12/1981 | Braukmann et al. . |
| 4,655,911 | | 4/1987 | Tabor . |
| 4,906,357 | * | 3/1990 | Drori . |
| 5,089,131 | * | 2/1992 | Gentry . |
| 5,228,993 | | 7/1993 | Dori . |
| 5,632,903 | * | 5/1997 | Caracciolo, Jr. . |
| 5,720,874 | * | 2/1998 | Siegler . |

FOREIGN PATENT DOCUMENTS

| | | |
|---|---|---|
| 41 05 109 | 8/1991 | (DE) . |
| 0429409 | 11/1990 | (EP) . |

* cited by examiner

Primary Examiner—Matthew O. Savage
Assistant Examiner—Terry K. Cecil
(74) Attorney, Agent, or Firm—Hedman & Costigan, P.C.

(57) ABSTRACT

A filtering device includes a cylindrical screen 2 having a rotatable backwash tube 3 provided coaxially therein. The backwash tube includes a first end portion including an inlet 3c for introducing filtered liquid and a second end portion including an opening 3d for discharging filtered liquid and introducing backwash water. A plurality of backwash water injection holes 13d are formed along the backwash tube in an axial direction thereof at a predetermined interval. A check valve 14 is disposed within the backwash tube adjacent the inlet 3c such that in a filtration operation filtered liquid is allowed to flow from the inlet 3c into the backwash tube 3 and then into the liquid transfer tube 9. In a backwash operation, the check valve prohibits backwash water from flowing to the inlet from the backwash tube. The backwash tube rotation means may be a blade 15 disposed on an inner side of the backwash tube or may be the injection holes formed at an angle to a radial direction of the backwash tube in a horizontal plane. Also described is an embodiment wherein a plurality cylindrical screens are disposed within a filter container and wherein a plurality of filter containers may be provided in parallel.

6 Claims, 11 Drawing Sheets

FILTERING DEVICE WITH ROTATABLE BACKWASH TUBE

BACKGROUND OF THE INVENTION

This invention relates to a filtering device and, more particularly, to a filtering device suitable for use for precision filtering in a state submerged in liquid to be filtered. Liquid to be filtered includes water for general uses, drinking water, river water, pool water and chemicals.

Known in the art of filtering device is one which employs a plurality of filter tubes. In this filtering device, a plurality of filter tubes are provided in parallel in a container. Liquid to be filtered is introduced from an inlet provided in one end portion of the container via a pump and filtered through these filter tubes and filtered liquid, i.e., liquid which has passed through the filter tubes, is delivered out of a filtered liquid outlet provided in the other end portion of the container.

For the filter tubes used in the prior art filtering device, filter elements for precision filtering which consists of a porous material or a filtering cloth having densely formed pores are used. In these filtering cloth having densely formed pores of these filter elements, however, pores of these filter elements are blocked by fine powdery materials suspending in the liquid to be filtered in a relatively short period of time after starting of operation of the filtering device with the result that filtering efficiency is rapidly dropped. For this reason, the filtering operation of the filtering device has to be stopped for performing backwashing of the surface of the filter elements and resumed after removing the materials which have blocked the pores of the filter elements.

Backwashing has conventionally been made by supplying pressurized backwash water from an outlet of filtered liquid of a container into a filter tube to remove solids blocking pores of a filter element which constitutes the filter tube.

In the conventional backwashing method, it frequently occurs that when solids have been first dislodged from a part of pores which have been blocked and the part of pores are thereby opened, the backwash water injects from the part of pores which have been opened and the pressure of the backwash water applied to the other pores which have not been opened yet thereby is reduced with the result that the backwashing operation is finished while these pores remain blocked with solids. Accordingly, even if backwashing is repeated periodically, blocking of the filter element increases gradually until at last it becomes necessary to replace the entire filter element and this significantly reduces the efficiency of the filtering device.

It is, therefore, a primary object of the invention to provide a filtering device having an improved backwashing device capable of effectively preventing blocking of a filter element.

Since a filter element of the conventional filtering device causes blocking in a relatively short period of time, stopping of the filtering operation and performing of backwashing must be made frequently with resulting decrease in the filtering efficiency.

It is, therefore, another object of the invention to provide a filtering device which can significantly reduce frequency of stopping of the filtering operation and performing of backwashing in combination with the above described improved backwashing device.

SUMMARY OF THE INVENTION

For achieving the above described primary objects of the invention, there is provided a filtering device comprising a cylindrical screen, backwash tube made of a tubular member provided in said cylindrical screen coaxially with said cylindrical screen and rotatable about its axis, having an inlet for introducing filtered liquid in one end portion thereof and an opening for discharging filtered liquid and introducing backwash water in the other end portion thereof and having a plurality of backwash water injection holes formed along said backwash tube in an axial direction thereof at a predetermined interval, a liquid transfer tube communicating with said opening for receiving filtered liquid from said backwash tube and for introducing backwash water to said backwash tube, a check valve disposed within said backwash tube adjacent said inlet such that in a filtration operation filtered liquid is allowed to flow from said inlet into said backwash and liquid transfer tubes, and in a backwash operation backwash water is prohibited from flowing to said inlet from said backwash tube, and a backwash tube rotation means for rotating said backwash tube about its axis.

According to the invention, by injecting backwash water under pressure from the backwash water injection holes formed at a predetermined interval in the axial direction while rotating the backwash tube about its axis in the cylindrical screen, the backwash water is injected in a jet stream under a concentrated large pressure and this jet stream of backwash water sequentially collides with the entire inner periphery of the cylindrical screen as the backwash tube is rotated whereby blocking of the cylindrical screen is removed uniformly over the entire inner periphery of the cylindrical screen.

In one aspect of the invention, said backwash tube rotation means is a blade mounted on an inner surface of the backwash tube. According to this aspect of the invention, when the backwash water under pressure is introduced into the backwash tube, the flow of the backwash water pushes the blade and the backwash tube thereby is rotated. Therefore, for rotating the backwash tube, another drive unit including an electric motor and an electrical driving circuit is unnecessary so that the filtering device can be constructed in a compact design at a minimum cost.

In another aspect of the invention, said backwash tube rotation means consists of the backwash water injection holes of the backwash tube which are formed at an angle to radial direction of the backwash tube in a horizontal plane. According to this aspect of the invention, when the backwash water under pressure is introduced into the backwash tube, the backwash water stream which is injected from the injection holes which are offset from the radial direction of the backwash tube collides with the inner wall surface of the cylindrical screen in the form of an offset flow and the backwash tube thereby is rotated in one direction. Therefore, as in the structure including the blade mounted on the backwash tube, no other drive device is required for rotating the backwash tube.

For achieving the above described second object of the invention, there is provided a filtering device which further comprises a filter container in which one or more of said cylindrical screens are housed, said filter container comprising an inlet for the liquid to be filtered, an outlet for the liquid to be filtered, a liquid transfer opening communicating with said liquid transfer tube and a drain outlet, said inlet for the liquid to be filtered having a larger diameter than the liquid transfer opening, and a pump connected between said inlet for the liquid to be filtered and said outlet for the liquid to be filtered to form a closed circuit between said inlet and outlet for the liquid to be filtered, said pump acting to compulsorily introduce, from said inlet for the liquid to be filtered, the liquid to be filtered of a larger amount than an amount of the filtered liquid which can flow out of said liquid transfer opening thereby to create, in said filter container, a flow of the liquid to be filtered having a direction which is different from direction of a flow of the liquid to be filtered into the cylindrical screen.

According to the invention, there is created a flow of the liquid to be filtered having a direction which is different from direction of a flow of the liquid to be filtered into the cylindrical screen. Powdery solids causing blocking of the screen suspending in the liquid to be filtered are washed away from the surface of the cylindrical screen by the flow having the different direction from the direction of the flow into the cylindrical screen and an amount of the powdery solids which enter the slits of the cylindrical screen is reducedd. The speed of blocking of the cylindrical screen thereby is reduced. Thus, together with the effect of the improvement in the backwashing by the rotary backwash tube, frequency of stopping driving of the filtering device for backwashing is reduced and the efficiency of the filtering operation is greatly improved.

In one aspect of the invention, a plurality of said filter containers are provided in parallel and the inlet for the liquid to be filtered, the outlet for the liquid to be filtered, the liquid transfer opening and the drain outlet of the respective filter containers are connected to one another by means of common connecting pipes to form a small size module.

In still another aspect of the invention, the common connecting pipes of a plurality of said small size modules of filter containers are connected to one another by means of common connecting pipes to form a large size module.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

FIGS. 1 to 7 illustrate an embodiment of the invention. A filtering device 1 includes a cylindrical screen 2 and a backwash tube 3 provided in the cylindrical screen 2.

Figure 4:
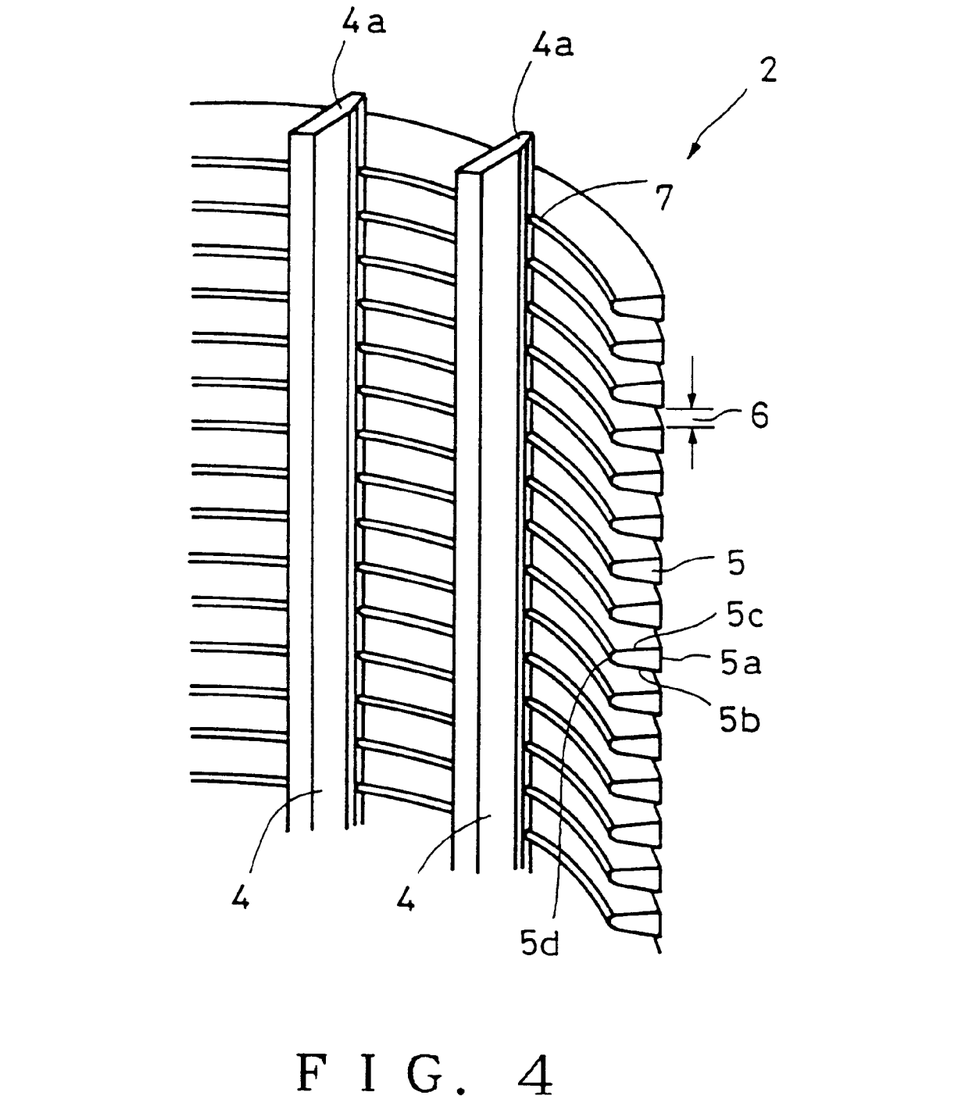
FIG. 4 is an enlarged partial perspective view of the cylindrical screen.
Figure 5:
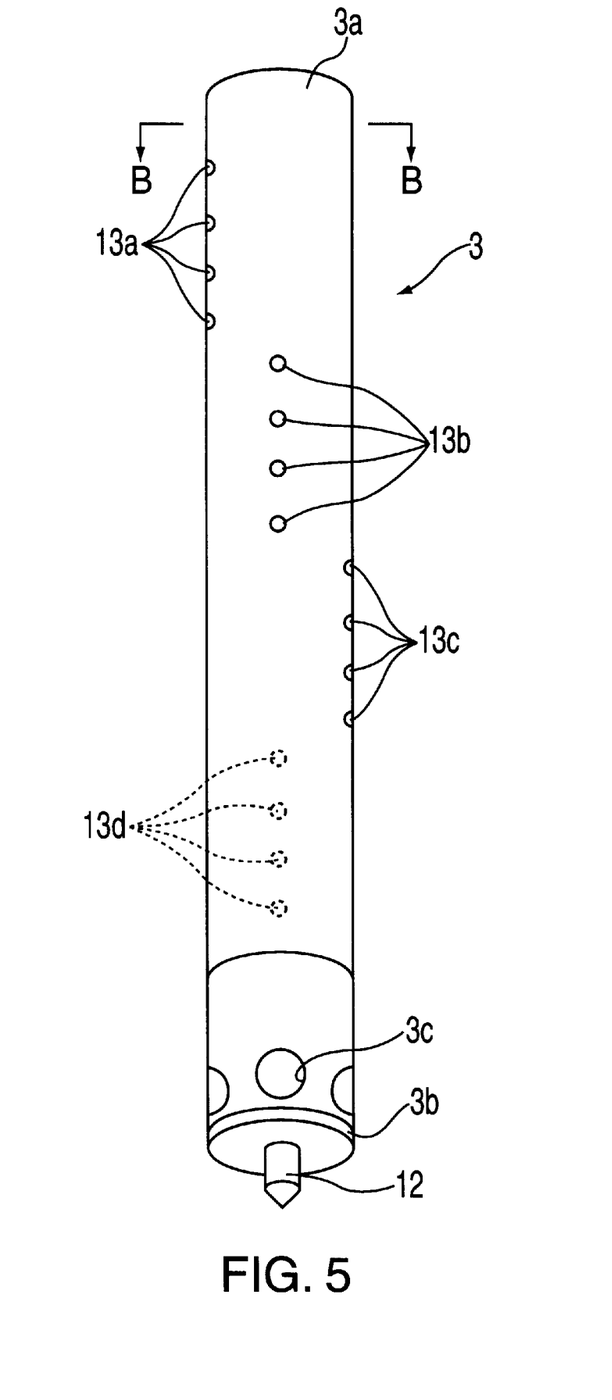
FIG. 5 is a perspective view of the backwash tube.
Figure 6:
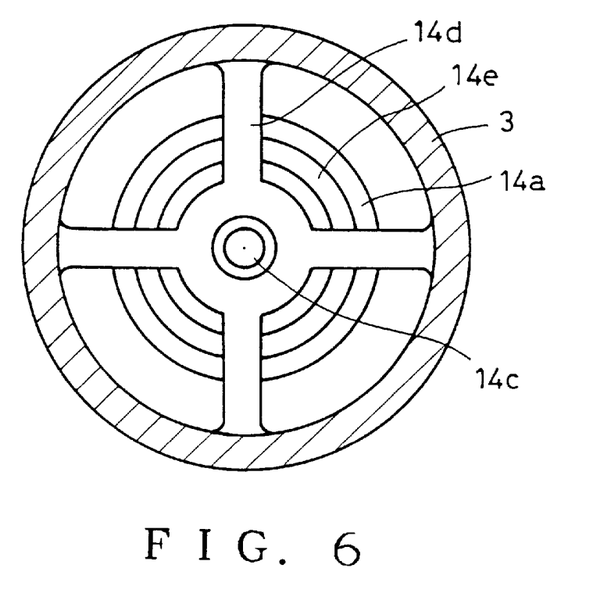
FIG. 6 is a view taken along lines A—A in FIG. 2.
Figure 7:
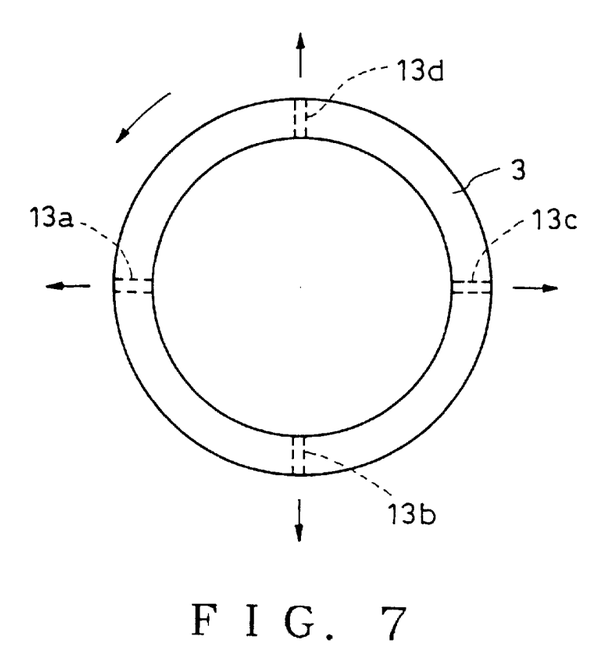
FIG. 7 is a view taken along lines B—B in FIG. 5.

In the present embodiment, the cylindrical screen 2 has, as will be apparent from FIG. 4, support rods 4 extending in the axial direction of the screen 2 and arranged generally cylindrically with a predetermined interval and having projecting portion 4a in radially outward end portion and a wedge wire 5 wound spirally on the outside of the support rods 4 in substantially crossing direction to the support rods 4. The wedge wire 5 is arranged with its one side 5a facing outside and two other sides 5b and 5c forming a slit 6 which widens radially inwardly between adjacent wedge wire portions and with an inward apex 5d of the wedge wire 5 being welded to the projecting portion 4a of the support rods 4 at crossing points 7 of the wedge wire 5 and the support rod 4. The upper portions of the wedge wire 5 and the support rods 4 are welded to an annular flange 16 and the lower end of the screen 2 is closed by a seal plate 8 (FIG. 1).

Figure 1:
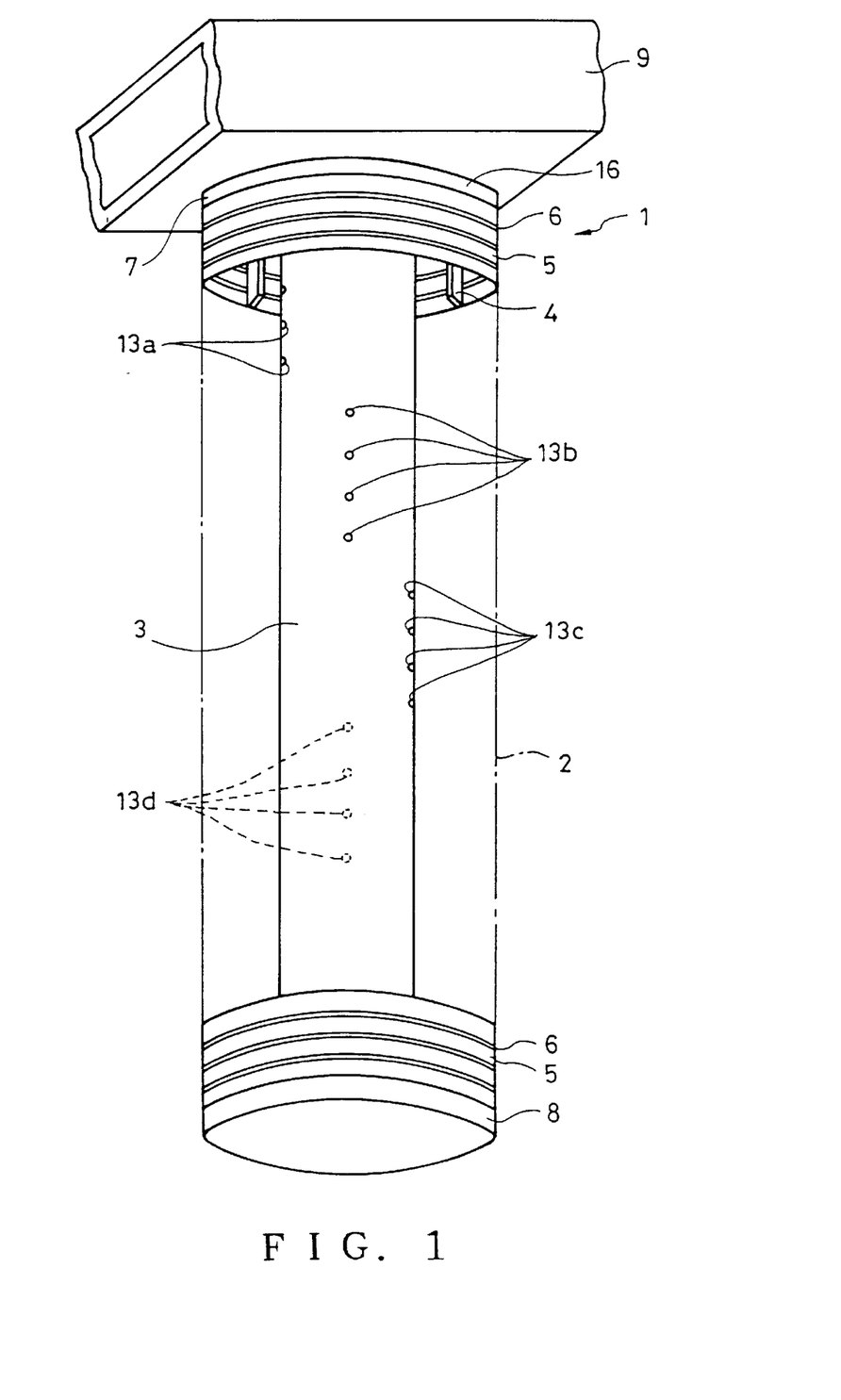
FIG. 1 is a persepective view showing an embodiment of the filtering device made according to the invention.
Figure 2:
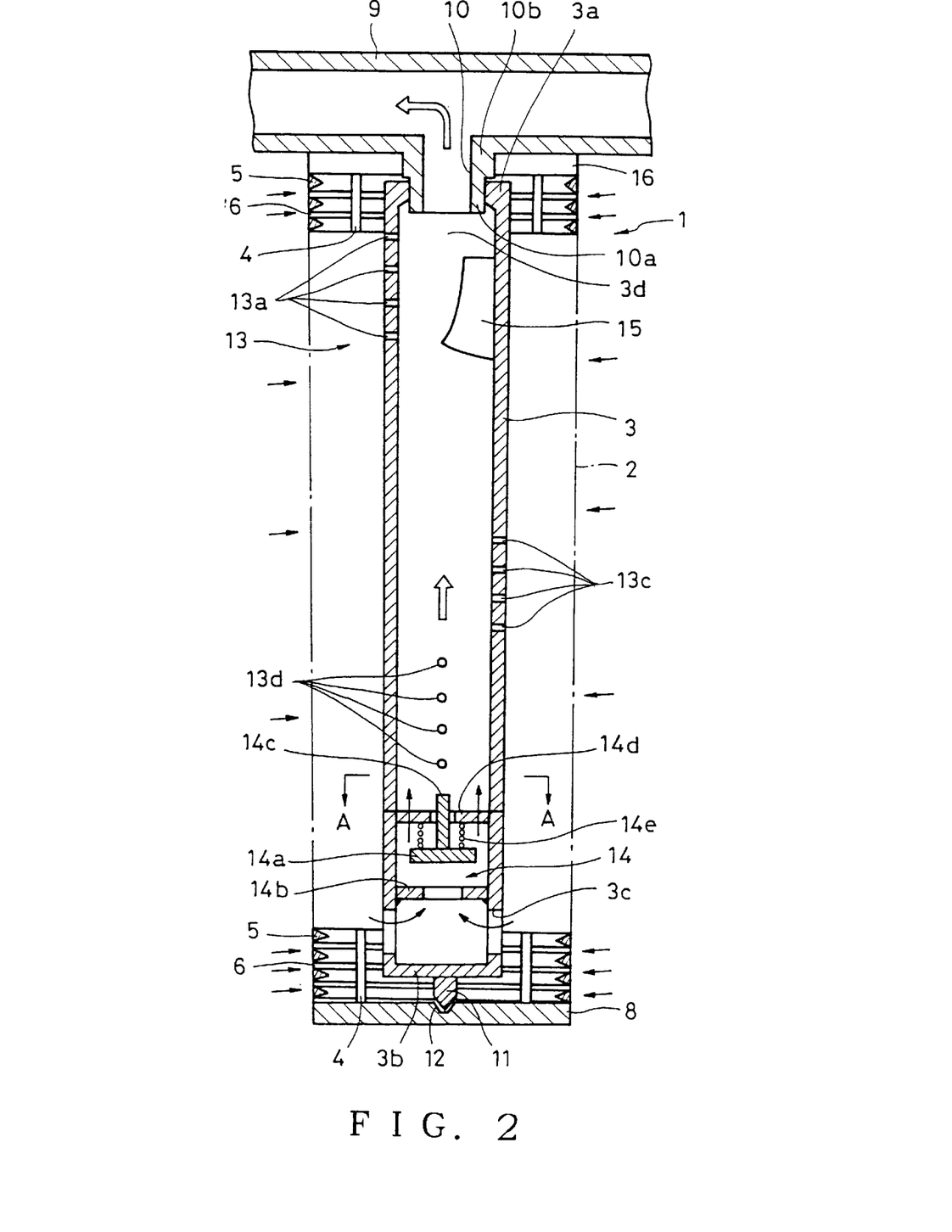
FIG. 2 is a vertical sectional view of the filtering device during the filtering operation.
Figure 3:
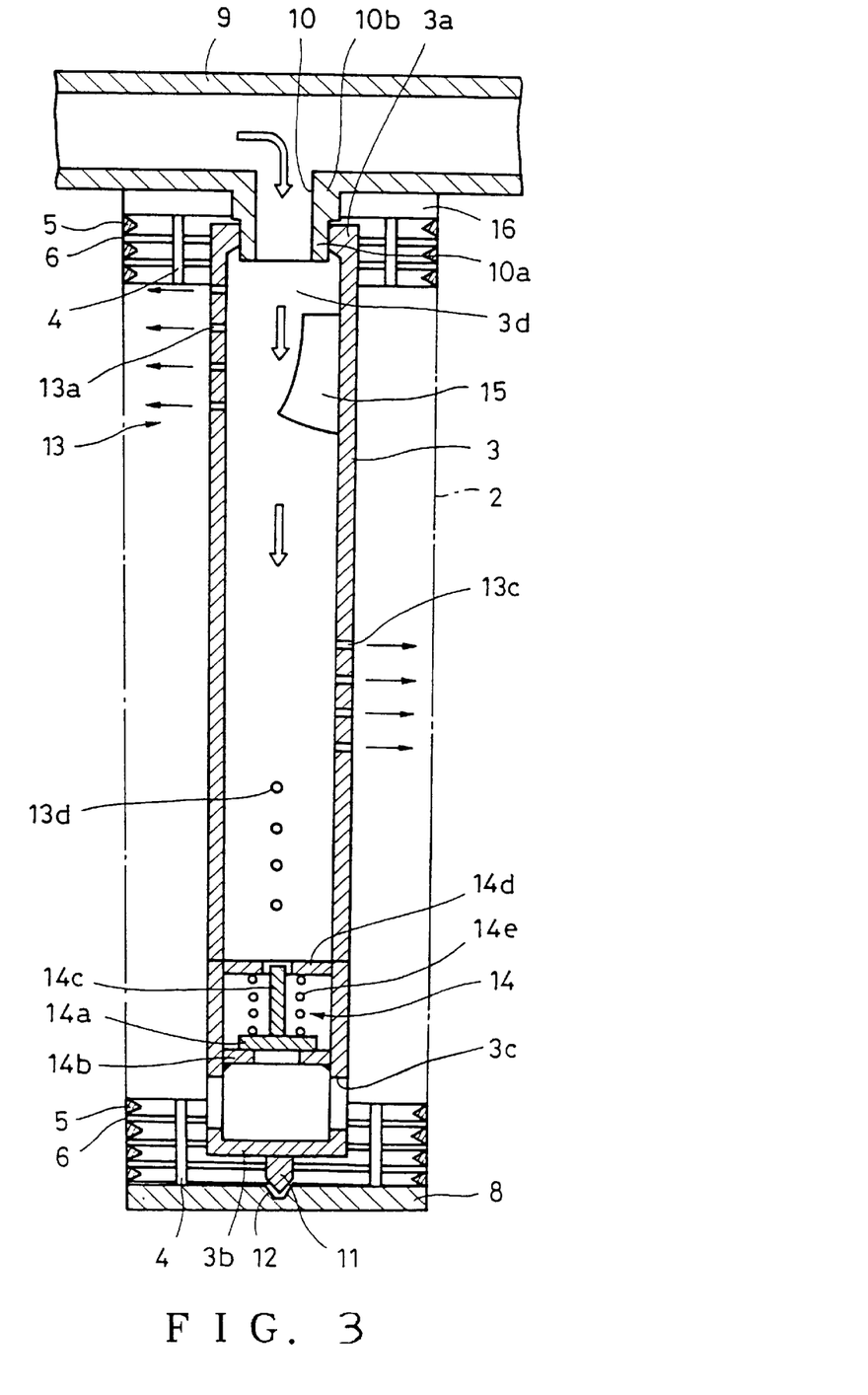
FIG. 3 is a vertical sectional view of the filtering device during backwashing.

In FIGS. 1 to 3, the upper and lower portions of the support rods 4 and the wedge wire 5 of the cylindrical screen 2 are illustrated and the middle portions thereof are shown by chain-and-dot lines.

Figure 11:
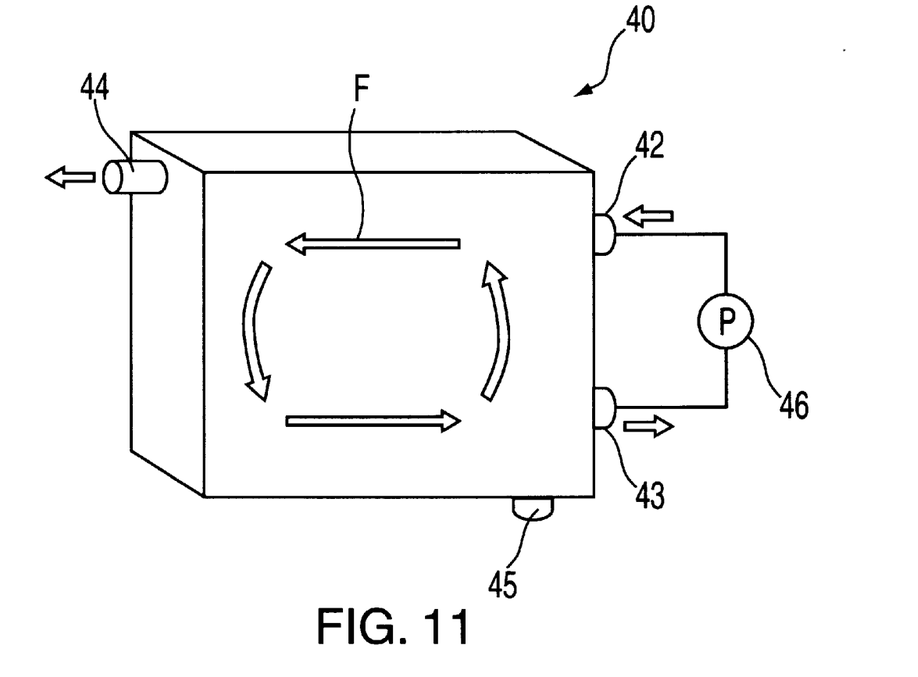
FIG. 11 is a perspective view schematically showing another embodiment of the invention.
Figure 12:
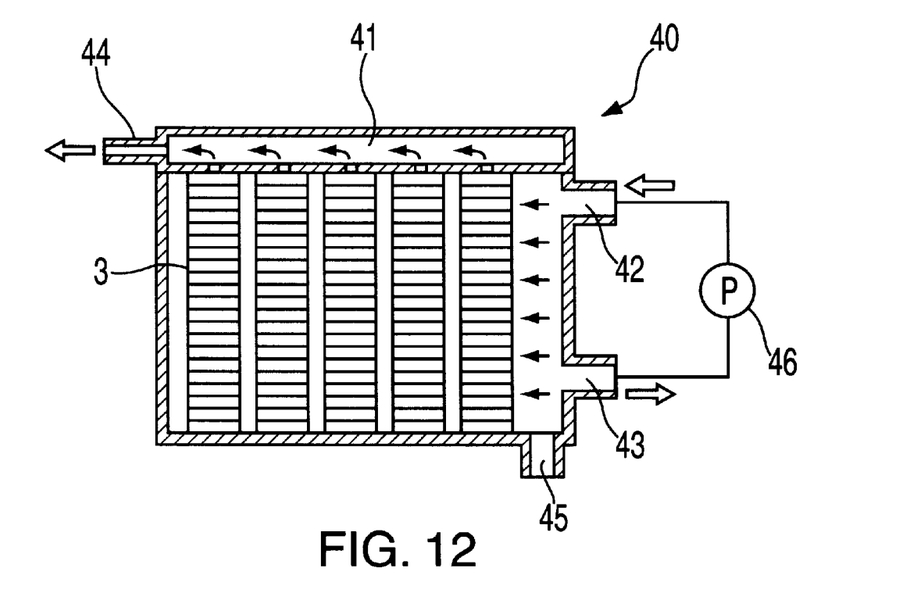
FIG. 12 is a sectional view of the same embodiment.

As shown in FIGS. 11 and 12, one or more of the cylindrical screens 2 may be provided in a filter container or containers with the seal plate 8 thereof being in contact with the bottom plate of the filter container.

A liquid transfer tube 9 of a rectangular cross section is provided above the cylindrical screen 2. In a bottom portion of the liquid transfer tube 9 is formed a tubular opening 10 for discharging filtered liquid and introducing backwash water coaxially with the cylindrical screen 2. The tubular member forming the opening 10 is formed with a step in the central portion in vertical direction. A lower stepped portion 10a has a smaller outer diameter than an upper stepped portion 10b.

The backwash tube 3 is made of a tubular member provided in the cylindrical screen 2 coaxially with the cylindrical screen 2. An open upper end portion of the backwash tube 3 is formed as a slide portion 3a which has an inner diameter slightly larger than the outer diameter of the lower stepped portion 10a of the tubular opening 10 of the liquid transfer tube 9 and is fitted in the outer periphery of the lower stepped portion 10a. The lower end of the backwash tube 3 is closed by a bottom plate 3b in the form of a disk. A pivot 11 is provided in the central portion of the lower surface of the bottom plate 3b. This pivot 11 is received in a pivot receiving recess 12 formed in the seal plate 8 of the cylindrical screen 2 and the backwash tube 3 is thereby supported on the cylindrical screen 2. By this construction, the backwash tube 3 can rotate about its axis.

In the lower end portion of the backwash tube 3 is formed an opening 3c for filtered liquid. The inlet 3c is made of a plurality of circular openings. The upper open end portion of the backwash tube 3 constitutes an opening 3d for discharging filtered liquid and introducing backwash water. This opening 3d communicates with the tubular opening 10 of the liquid transfer tube 9.

The backwash tube 3 has a plurality of backwash water injection holes 13 formed at a predetermined interval in the axial direction (vertical direction). As will be apparent from FIGS. 5 and 7, in the present embodiment, groups of injection holes 13a, 13b, 13c and 13d each of which consists of four vertically arranged injection holes are disposed at an interval of 90 degrees circumferentially. This arrangement ensures uniform injection of backwash water and prevents occurrence of malfunction in the rotation of the backwash tube 3 which may be caused by reaction due to one-sided injection of the backwash water.

An optimum diameter of the injection holes 13 is 0.5 mm–0.8 mm. If the diameter exceeds 0.8 mm, pressure of the injected backwash water is not sufficient to effectively remove blocking. If the diameter is below 0.5 mm, there is likelihood that the injection holes will be blocked by fine dust.

As a preferred example, a backwash tube having a diameter of 20 mm may be provided in a cylindrical screen having a diameter of 70 mm and injection holes having a diameter of 0.7 mm may be formed at an interval of 5 mm in the backwash tube.

A check valve 14 is is disposed within said backwash tube 3 adjacent said inlet 3c. The check valve 14 includes a valve main body 14a in the form of a disk, an annular valve seat 14b on which the valve main body 14a can be seated, a stem 14c extending upwardly in the axial direction from the valve main body 14a, a valve holding member 14d (FIG. 6) consisting of an annular member loosely receiving the stem 14c and four support rods which secure the annular member fixedly to the inner wall of the backwash tube 3, and a coil spring 14e which is fixed in one end to the valve main body 14a and in the other end to the valve holding member 14d. The coil spring 14e is adjusted in its spring force so that the coil spring 14e is in a contracted state when no pressure of the backwash water is applied thereto and expands when it receives pressure of the backwash water to cause the valve main body 14a to be seated on the valve seat 14b. The check valve 14, therefore, functions to allow introduction of the filtered liquid from the inlet 3c into the backwash tube 3 and prohibiting flowing out of the backwash water from inside of the backwash tube 3 to the inlet 3c.

A blade 15 which constitutes the backwash tube rotation means for rotating the backwash tube 3 about its axis during backwashing is mounted fixedly on the upper inner wall surface of the backwash tube 3. The shape, size and angle of attachment of the blade 15 are determined having regard to the size of the backwash tube 3, magnitude of the backwash pressure and ncessary rotation speed of the backwash tube 3 etc.

The operation of this filtering device will now be described.

During the filtering operation, the liquid to be filtered is supplied in a filter container by actuating a pump. As shown in FIG. 2, the liquid to be filtered flows into the cylindrical screen 2 through the slits 6 of the cylindrical screen 2 and the filtered liquid flows into the backwash tube 3 through the inlet 3c. During this time, the check valve 14 is in an open state with the coil spring 14e contracted as shown in FIG. 2 so that the filtered liquid passes through the check valve 14 and flows in the direction of the arrow and then flows into the liquid transfer tube 9 through the opening 3d of the backwash tube 3 and the tubular opening 10 of the liquid transfer tube 9 and is delivered out.

For the backwashing operation, the liquid to be filtered in the filter container is discharged and then, as shown in FIG. 3, the backwash water under pressure is introduced from the opening 10 of the liquid transfer tube 9 into the backwash tube 3 through the opening 3d. The valve main body 14a of the check valve 14 is moved downwardly by the pressure of the backwash water against the force of the coil spring 14e to be seated on the valve seat 14b and thereby close the check valve 14. Accordingly, the backwash water under pressure in the backwash tube 3 is injected in the form of a jet stream from each of the backwash water injection holes 13 and this jet stream collides against the cylindrical screen 2. In the meanwhile, the backwash water flow strikes against the blade 15 and thereby pushes the blade 15 so that the backwash tube 3 is rotated about its axis. The strong jet streams of the backwash water sequentially collide against the entire inner periphery of the cylindrical screen 2 as the backwash tube 3 is rotated whereby blocking of the slits of the cylindrical screen 2 over the entire circumference can be uniformly removed.

Figure 8:
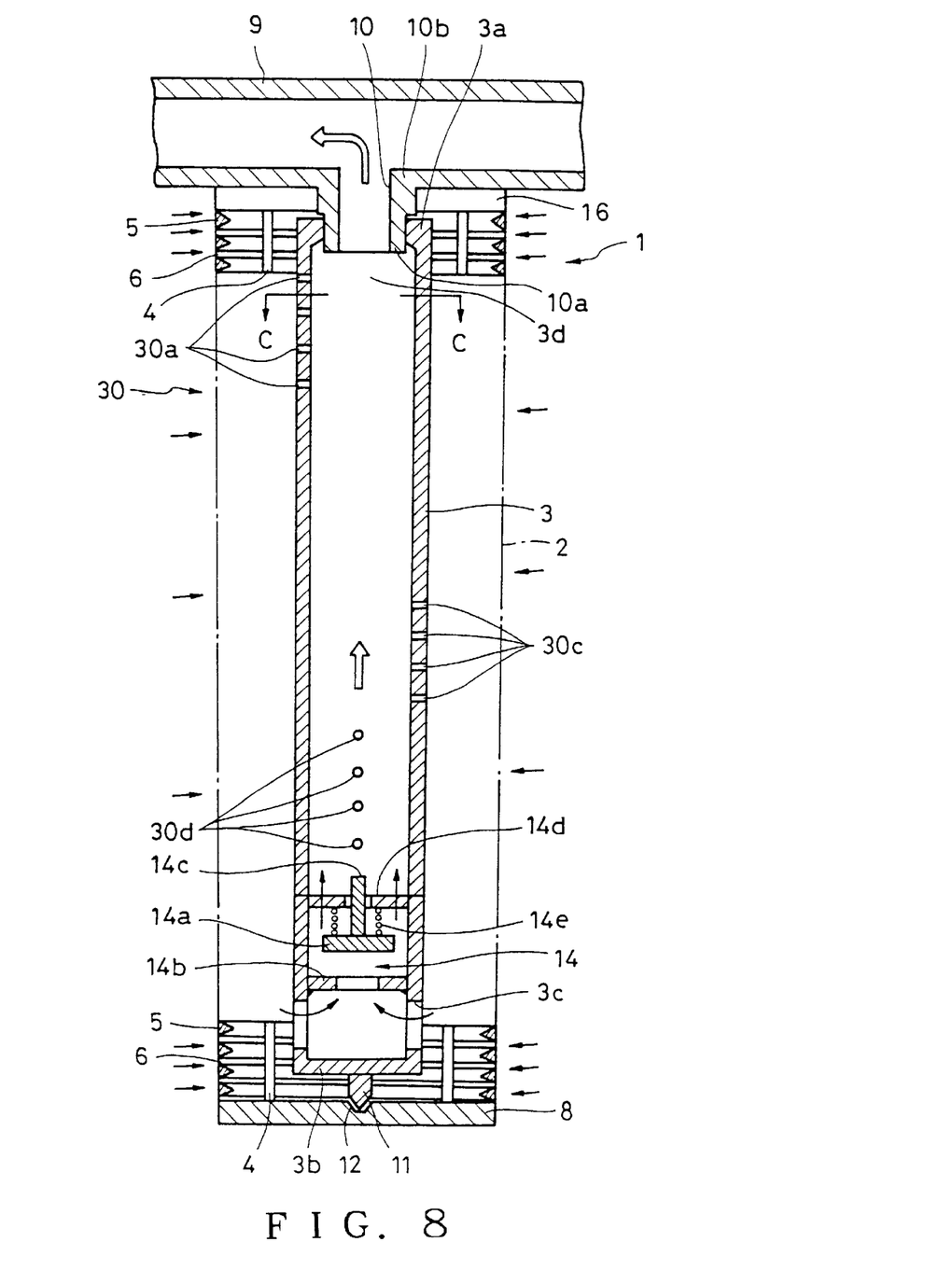
FIG. 8 is a vertical sectional view showing another embodiment of the filtering device during the filtering operation.
Figure 9:
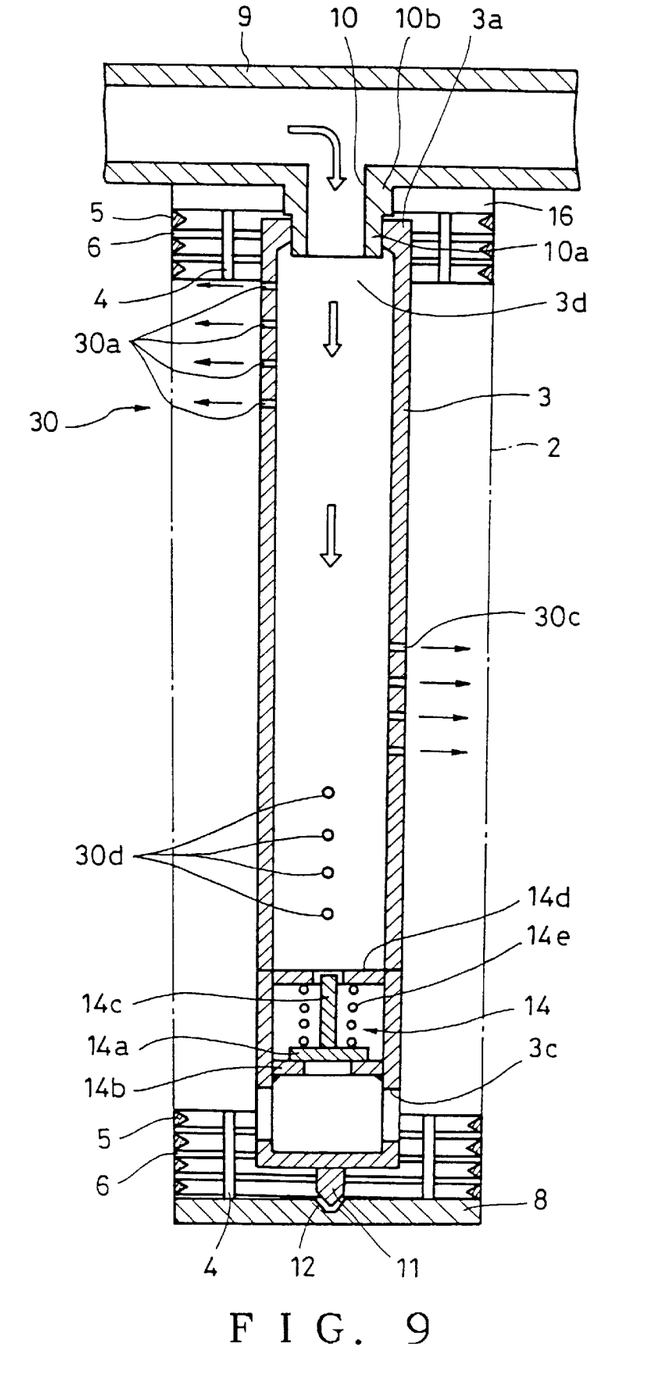
FIG. 9 is a sectional view showing the filtering device during backwashing.
Figure 10:
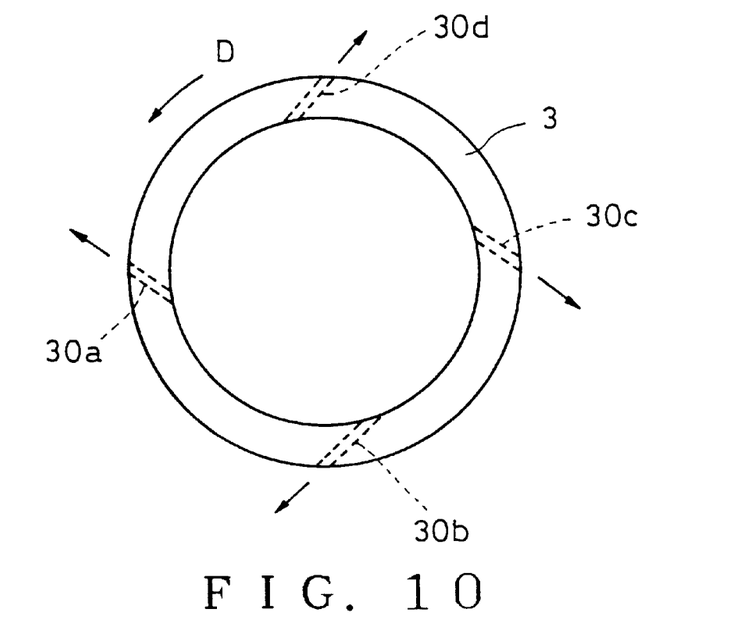
FIG. 10 is a view taken along lines C—C in FIG. 8.

FIGS. 8 to 10 show another embodiment of the invention. In this embodiment, the same component parts as those of the embodiment of FIGS. 1 to 7 are designated by the same reference characters and description thereof will be omitted.

This embodiment is different from the embodiment of FIGS. 1 to 7 in that the backwash tube rotation means is not the blade 15 as in the embodiment of FIGS. 1 to 7 but, as shown in FIG. 10, is made of backwash water injection holes 30 (30a, 30b, 30c and 30d) of the backwash tube 3 which are formed at a predetermined angle with respect to the radial direction of the backwash tube 3 in a horizontal plane. In the present embodiment, when the backwash water under pressure is introduced into the backwash water, the backwash water is injected from the offset injection holes 30 in the form an offset jet stream and collides against the inner wall surface of the cylindrical screen 2. As a result, the backwash tube 3 is rotated in the direction of the arrow D (FIG. 10). The other structure and operation of this embodiment are the same as those of the embodiment of FIGS. 1 to 7.

FIGS. 11 and 12 show another embodiment of the invention.

In this embodiment, one or more (five in the illustrated example) cylindrical screens 2 are provided in parallel in a box-like filter container 40. Each of these cylindrical screens is the one shown in FIGS. 1 to 7 or FIGS. 8 to 10. The openings for discharging the filtered liquid and introducing the backwash water of the backwash tubes 3 in the respective cylindrical screens 2 communicate with a common liquid transfer tube 41.

The filter container 40 has an inlet 42 for the liquid to be filtered, an outlet 43 for the liquid to be filtered, a liquid transfer opening 44 communicating with the liquid transfer tube 41 for the backwash tubes 3 and a drain outlet 45 which can be opened and closed as desired. The inlet 42 for the liquid to be filtered has a larger diameter than the liquid transfer opening 44. A pump 46 is connected between the inlet 42 for the liquid to be filtered and the outlet 43 for the liquid to be filtered to form a closed circuit between the inlet and outlet for the liquid to be filtered for circulation of the liquid to be filtered. By actuating the pump 46, the liquid to be filtered of a larger amount than an amount of the filtered liquid which can flow out of the liquid transfer opening 44 is compulsorily introduced from the inlet 42 and this creates, in the filter container 40, a flow (i.e., the circulating flow shown by arrow F in FIG. 11) of the liquid to be filtered having a direction which is different from direction of a flow of the liquid to be filtered into the cylindrical screen 2 through the slits 6.

In this embodiment, during the filtering operation, the drain outlet 45 is closed and the liquid to be filtered is supplied to the filter container 40. The liquid to be filtered flows into the cylindrical screen 2 and the filtered liquid is taken out of the liquid transfer opening 44 through the liquid transfer tube 41. Superfluous liquid to be filtered constitutes a flow having a direction which is different from direction of the flow into the cylindrical screen 2 and circulates in the filter container 40 thereby washing away powdery solids which cause blocking of the cylindrical screen 2 from the surface of the cylindrical screen 2 and thereby reducing the amount of blocking.

During the backwashing operation, the inlet 42 and the outlet 43 of the filter container 40 are closed and, after finishing filtering of the liquid to be filtered in the filter container 40, the drain outlet 45 is opened. Then, the backwash water under pressure is introduced from the liquid transfer opening 44 to perform backwashing in the manner described above. The soiled water after backwashing is drained from the drain outlet 45.

Figure 13:
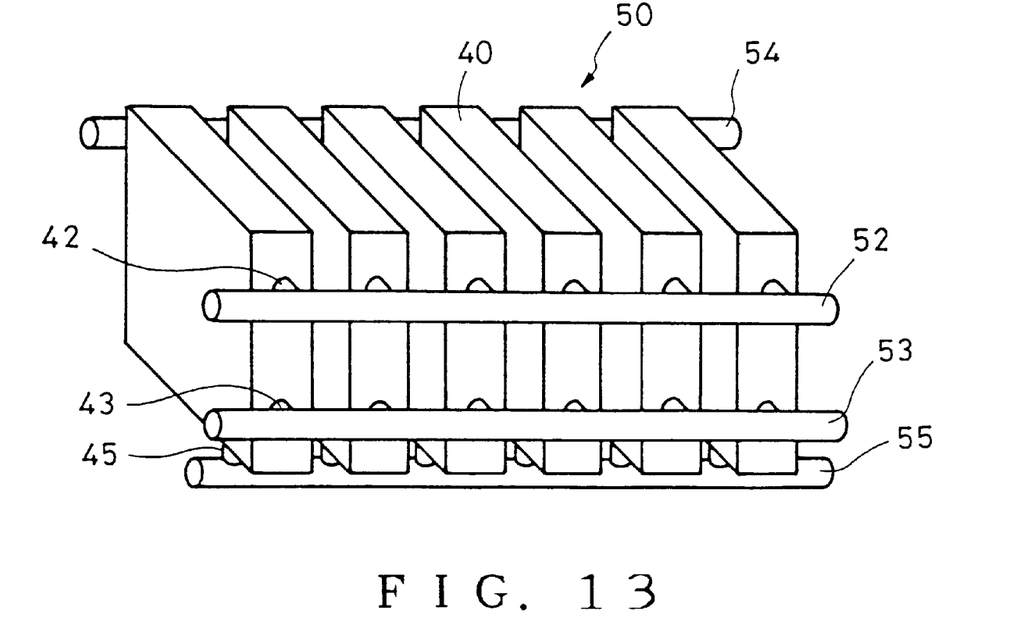
FIG. 13 is a perspective view showing another embodiment of the invention.

FIG. 13 shows another embodiment of the invention in which a plurality (six in the illustrated example) of the filter containers 40 of FIGS. 11 and 12 disposed in parallel. The inlets 42 of the respective filter containers 40 are connected together by means of a common connecting pipe 52. The outlets 43 of the respective filter containers 40 are connected together by means of a common connecting pipe 53. The liquid transfer openings 44 of the respective filter containers 40 are connected together by means of a common connecting pipe 54. The drain outlets 45 of the respective filter containers 40 are connected together by means of a common connecting pipe 55. By this arrangement, the filter containers 40 are combined together to form a small size module 50.

Figure 14:
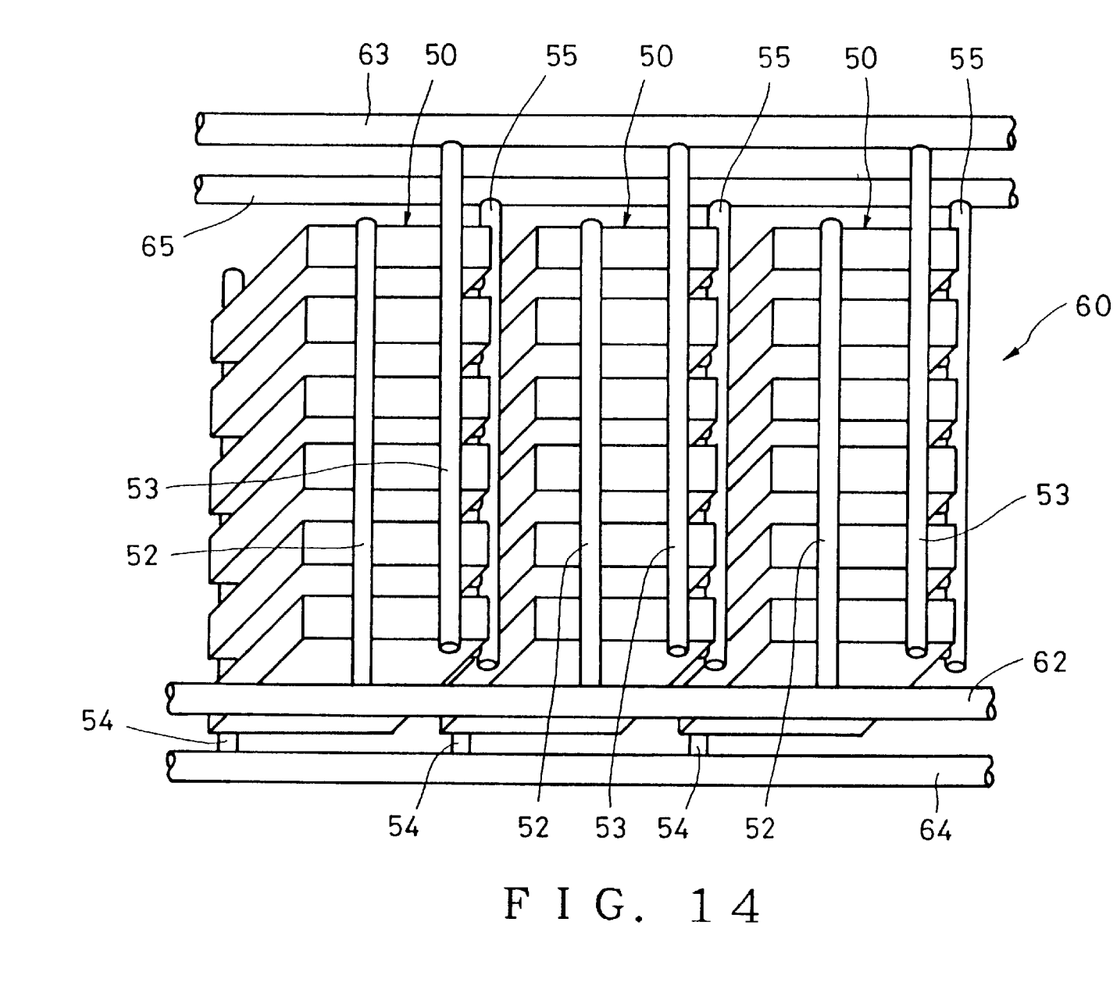
FIG. 14 is a perspective view showing another embodiment of the invention.

FIG. 14 shows another embodiment of the invention in which a plurality (three in the illustrated example) of the small size modules 50 are disposed in parallel. The common connection pipes 52, 53, 54 and 55 are respectively connected together by means of further common pipes 62, 63, 64 and 65 respectively to form a large size module 60.

In the above described embodiments, the cylindrical screens 2 are made as wedge wire screens. Alternatively, the cylindrical screens may be made of other filters elements such as wire-mesh and filter cloth.

As will be apparent from the foregoing description, the filtering device of the present invention can be used as a single cylindrical screen or can be used in the form in which a plurality of cylindrical screens are provided in a single filter container or in the form in which such filter containers are combined to form a small size module or in the form in which such small size modules are combined to form a large size module.

As the backwash tube rotation means for rotating the backwash tube about its axis, the blade mounted on the inner wall of the backwash tube or the offset injection holes are preferable but the backwash tube rotation means is not limited to them but the backwash tube may be rotated by an external rotation drive device such as an electric motor or a magnetic stirrer.

In the above described embodiments, the groups of the backwash water injection holes formed in the backwash tube are provided at an interval of 90 degrees circumferentially. Alternatively, the circumferential interval between each group of injection holes may be other angle such as 60 degrees or 180 degrees. In the above described embodiments, only one injection hole is formed circumferentially. Alternatively, two or more injection holes may be formed circumferentially depending upon condition of injection of the backwash water. In short, the number and location of the injection holes may be so determined that blocking of the cylindrical screen will be completely removed through backwashing by rotation of the backwash tube and malfunction in the rotation of the backwash tube caused by offsetting of the axis of the backwash tube due to reaction by the injection of the backwash water will be prevented.

What is claimed is:

1. A filtering device comprising:
   a cylindrical screen;
   a rotatable backwash tube disposed coaxially within said cylindrical screen and having a first end portion including an inlet for introducing filtered liquid, a second end portion including an opening for discharging filtered liquid and introducing backwash water, and a plurality of backwash water injection holes formed along said backwash tube in an axial direction thereof at a predetermined interval;
   a liquid transfer tube communicating with said opening for receiving filtered liquid from said backwash tube and for introducing backwash water to said backwash tube;
   a check valve disposed within said backwash tube adjacent said inlet such that in a filtration operation filtered liquid is allowed to flow from said inlet into said backwash and liquid transfer tubes, and in a backwash operation backwash water is prohibited from flowing to said inlet from said backwash tube; and
   a backwash tube rotation means for rotating said backwash tube about its axis.

2. A filtering device as defined in claim 1 wherein said backwash tube rotation means is a blade mounted on an inner surface of the backwash tube.

3. A filtering device as defined in claim 1 wherein the backwash tube rotation means consists of the backwash water injection holes of the backwash tube which are formed at an angle to a radial direction of the backwash tube in a horizontal plane.

4. A filtering device as defined in claim 1 which further comprises:
   a filter container in which one or more of said cylindrical screens are housed, said filter container comprising an inlet for the liquid to be filtered, an outlet for the liquid to be filtered, a liquid transfer opening communicating with said liquid transfer tube and a drain outlet, said inlet for the liquid to be filtered having a larger diameter than the liquid transfer opening; and
   a pump connected between said inlet for the liquid to be filtered and said outlet for the liquid to be filtered to form a closed circuit between said inlet and outlet for the liquid to be filtered, said pump acting to compulsorily introduce, from said inlet for the liquid to be filtered, the liquid to be filtered of a larger amount than an amount of the filtered liquid which can flow out of said liquid transfer opening thereby to create, in said filter container, a flow of the liquid to be filtered having a direction which is different from direction of a flow of the liquid to be filtered into the cylindrical screen.

5. A filtering device as defined in claim 4 wherein a plurality of said filter containers are provided in parallel and the inlet for the liquid to be filtered, the outlet for the liquid to be filtered, the liquid transfer opening and the drain outlet of the respective filter containers are connected to one another by means of common connecting pipes to form a small size module.

6. A filtering device as defined in claim 5 wherein the common connecting pipes of a plurality of said small size modules of filter containers are connected to one another by means of common connecting pipes to form a large size module.

* * * * *